United States Patent [19]

Ikeda et al.

[11] Patent Number: 4,489,344
[45] Date of Patent: Dec. 18, 1984

[54] SIGNAL PROCESSING UNIT

[75] Inventors: Masaki Ikeda; Tatsuyuki Amano; Kazuo Tokuda, all of Tokyo, Japan

[73] Assignee: Nippon Electric Co., Ltd., Tokyo, Japan

[21] Appl. No.: 413,656

[22] Filed: Sep. 1, 1982

[30] Foreign Application Priority Data

Sep. 1, 1981 [JP] Japan ................................ 56-137439
Sep. 17, 1981 [JP] Japan ................................ 56-146765

[51] Int. Cl.³ ............................................. H04N 9/535
[52] U.S. Cl. ........................................ 358/22; 358/27
[58] Field of Search ............... 358/181, 27, 34, 147, 358/22; 328/127

[56] References Cited

U.S. PATENT DOCUMENTS

3,651,248 3/1972 Schneider ............................. 358/34

Primary Examiner—John C. Martin
Assistant Examiner—Erin A. McDowell
Attorney, Agent, or Firm—Sughrue, Mion, Zinn, Macpeak, and Seas

[57] ABSTRACT

In a signal processing device, such as a television receiver, a multiplex signal processing circuit with a switching device for selecting either a first image signal and a second image signal. A clamping circuit is provided for clamping the pedestal potential of the second signal at a reference voltage, a comparator compares the pedestal potential of the first signal with the reference voltage, and the pedestal potential of the first signal is equalized to the reference signal in accordance with the comparator output.

10 Claims, 3 Drawing Figures

SIGNAL PROCESSING UNIT

BACKGROUND OF THE INVENTION

The present invention relates to a signal processing unit in a television system, and more particularly, to a signal processing unit for outputting one video signal out of two input video signals.

In recent years, such a multiplex television broadcast system has been developed that along with video signals corresponding to ordinary television images, multiplex broadcast signals such as video signals or coded signals corresponding to other images such as characters, figure patterns, etc. are also transmitted during vertical retrace periods, and on a receiver side, either of the ordinary television video signals and the multiplex broadcast signals are selected on demand to display either the ordinary television images or the other images transmitted as the multiplex broadcast. The multiplex broadcast images may be displayed on a part or whole of the image screen. In the United Kingdom and France, such systems have been put in practical use as "TELETEXT" and "ANTIOPE", respectively. In the United States and Japan, it is still in the experimental stage.

The multiplex broadcast signals corresponding to the multiplex broadcast images, which are transmitted during vertical retrace periods, have little information content because the vertical retrace period is short and signals necessitated for interlacing in the next field such as equalizing pulses, horizontal synchronizing pulses, etc. are also transmitted during the same period. Therefore, on the receiver side, the multiplex broadcast signals transmitted and received during the vertical retrace periods are first stored in a memory device. Then, video signals corresponding to the multiplex broadcast images are processed on the basis of the stored signals to obtain three primary color signals (R', G', B'). On the other hand, video signals corresponding to the ordinary television images are derived as three primary color signals (R, G, B) by means of a conventonal video signal processing circuit. Driving a picture tube by means of the three primary color signals, images are reproduced on the image screen of the picture tube. In the following, for the purpose of discriminating the primary color signals corresponding to the ordinary television images from the primary color signals corresponding to the multiplex broadcast images, the former are called simply "original primary color signals," while the latter are called "external primary color signals".

In order to display the multiplex broadcast images on a part or whole of the image screen of the picture tube in place of the ordinary television images, a signal switching unit is necessary for switching the original primary color signals and the external primary color signals to apply one of them to a picture tube. What is required for the signal switching unit is to maintain the pedestal potential and the maximum amplitude level between the original primary color signals and the external primary color signals at the same constant values so that the brightness and contrast of the images may be identical even when switching is effected between the ordinary television images and the multiplex broadcast images. Moreover, it is also important that the signal switching unit should be easily coupled to a video signal processing circuit for processing the video signals corresponding to the ordinary television images to derive the original primary color signals. The signal switching unit should preferably be formed as a monolithic integrated circuit with a few external parts. Furthermore, the signal switching unit is required not to be affected by the voltage variation in a reference voltage for giving a pedestal potential due to the change in the environmental temperature.

In some cases, the maximum amplitude level of the original primary color signals may be higher than that of the external primary color signals. For instance, in the "ANTIOPE" system in France, the maximum amplitude level of the original primary color signals is preset at 3 Vp-p (peak-to-peak), while that of the external primary color signals is preset at 1 Vp-p. In this case, if the maximum amplitude levels of the respective primary color signals are not equalized, a difference is observed in the displaced pictures, especially in their contrasts. In order to equalize the maximum amplitude levels of the respective primary color signals, by way of example, the external primary color signals (R', B', G') may be preliminarily amplified so as to be equalized to the amplitudes of the original primary color signals. However, this method has shortcomings in that the dynamic range of the signal switching unit becomes narrow and it is difficult to provide a contrast control circuit or the like subsequent to the signal switching unit. In another example, it is also possible to equalize amplitude level of the original primary color signals to that of the external primary color signals by reducing the gain of the video signal processing circuit for deriving the primary color signals from the ordinary color television image signals, and to then select the primary color signals by the signal switching unit and amplify them. However, according to this method, the gain of the video signal processing circuit is reduced, and therefore a leakage current of a carrier component contained in a demodulated color difference signal would become large. As a result, the S/N ratio of the displayed picture is degraded.

Thus, the signal switching unit for switching the primary color signals of the ordinary television images and the external primary colors signals of the multiplex broadcast images to output one primary color signal group must fulfil the above-mentioned essential conditions. However, a signal switching unit which can fulfil these essential conditions has not been provided in the prior art.

SUMMARY OF THE INVENTION

It is therefore one object of the present invention to provide a signal processing circuit suitable to a monolithic integrated circuit for outputting either original primary color signals or external primary color signals whose pedestal potentials are equalized with each other, and which is not affected by the voltage variation in a reference voltage for defining the pedestal potential caused by the change in the environmental temperature.

Another object of the present invention is to provide a signal processing circuit which receives original primary color signals and external primary color signals whose maximum amplitude levels are different from each other, and outputs either one of them after equalizing their maximum amplitude levels.

According to one aspect of the present invention, a signal processing circuit comprises signal switching means adapted to receive a first signal or signals for a first image and a second signal or signals for a second image for outputting either one of them, clamp means for clamping a pedestal potential of the second signal or signals at a reference voltage, comparator means for comparing a pedestal potential of the first signal or signals with the reference voltage, and feedback means responsive to the output of the comparator means for equalizing the pedestal potential of the first signal or signals to the reference voltage.

According to another aspect of the present invention, the signal processing unit further comprises attenuator means having input, output and common terminals, and the first signal is applied to the input terminal of the attenuator means and derived from the output terminal thereof to be applied to the signal switching means. Preferably, the attenuation factor of the attenuator means is preset such that the maximum amplitudes of the first and second signals may be equalized, and the common terminal of the attenuator means is applied with the reference voltage.

In the signal processing circuit according to the present invention, the pedestal potential of the second signal is clamped at the reference voltage, so that the both voltages become equal to each other. The pedestal potential of the first signal is compared with the reference voltage and then equalized to the second signal by the feedback means. Accordingly, either one of the first and second signals, whose pedestal potentials have been equalized to the reference voltage, can be output from the signal switching means. In addition, even if the reference voltage is varied due to the change in the environmental temperature, the pedestal potentials of the first and second signals are still kept equalized to each other by the comparator means and feedback means and by the clamp means, respectively. Accordingly, either one of the first and second signals having the same pedestal potential can be outputted free from the variation of the environmental temperature.

In the case where the maximum signal level of the first signal is higher than that of the second signal, the first signal is applied through the attenuator means to the signal switching means. Accordingly, either one of the first and second signals having the same maximum amplitude level can be outputted without narrowing the input dynamic range of the signal switching means and, moreover, without lowering the gain of the circuit for generating the first signal. At this time, the reference voltage is applied to the common terminal of the attenuator means. Therefore, when the attenuation factor of the attenuator means is preset such that the maximum amplitude levels of the first and second signals may be equalized, the D.C. potential, that is, the pedestal potential of the first and second signals, would not be varied but would be equalized to the reference voltage, and only the A.C. component of the first signal would be attenuated to the same maximum amplitude level as the second signal.

BRIEF DESCRIPTION OF THE DRAWINGS

The above-mentioned and other objects, features and advantages of the present invention will become more apparent from the following description of the invention taken in conjunction with the accompanying drawings.

DETAILED DESCRIPTION OF THE EMBODIMENTS

Now one preferred embodiment of the present invention will be described with reference to FIG. 1. The ordinary television image signal transmitted from a broadcast station is converted into a composite video signal. The composite video signal is applied to a terminal $T_{10}$ of a monolithic integrated circuit 10 which acts as a video signal processing circuit for deriving original primary color signals (R, G, B). The composite video signal applied to the terminal $T_{10}$ is led to a demodulator 90 where three color difference signals R-Y, G-Y and B-Y are generated. In addition, a luminance signal Y is produced from the video signal of the ordinary television image, and applied to another terminal $T_{16}$ of the monolithic integrated circuit 10. The luminance signal Y applied to the terminal $T_{16}$ is fed to an RGB matrix circuit 30 through a contrast control amplifier 40 whose gain is controlled according to a voltage applied to a contrast control terminal $T_{11}$. The color difference signals R-Y, G-Y and B-Y generated by the demodulator circuit 90 are also applied to the RGB matrix circuit 30. Hence, the RGB matrix circuit 30 generates original primary color signals R, G and B of the ordinary television image in response to the luminance signal Y and the color difference signals R-Y, G-Y and B-Y. The generated original primary color signals R, G and B have their pedestal potentials clamped at the voltage generated by a brightness control circuit 50 in accordance with the voltage applied to a brightness control terminal $T_{12}$, by means of pedestal clamp circuits 60, 70 and 80, respectively, and the clamped original primary color signals R, G and B are generated from output terminals $T_{13}$, $T_{14}$ and $T_{15}$, respectively. The above-mentioned video signal processing circuit 10 has been commonly used in conventional television receiver sets and involves nothing novel.

On the other hand, multiplex broadcast image signals representing characters, figure patterns, etc. which have been transmitted during a vertical retrace period, are fed to a multiplex broadcast image signal processing circuit 500. As described previously, the multiplex broadcast image signal processing circuit 500 first stores the multiplex broadcast image signals and then processes the stored signals to generate external primary color signals R', G' and B' at its output.

The original primary color signals R, G and B fed from the video signal processing circuit 10 and the external primary color signals R', G' and B' fed from the multiplex broadcast image signal processing circuit 500 are respectively applied to separate groups of primary color signal input terminals $T_{103}$, $T_{104}$ and $T_{105}$, and $T_{106}$, $T_{107}$ and $T_{108}$. The two red primary color signals R and R' are applied to an R-switching circuit 110 through the terminals $T_{103}$ and $T_{106}$, respectively. Likewise, the two green primary color signals G and G' and two blue primary color signals B and B' are respectively applied to a G-switching circuit 120 and a B-switching circuit 130. The R-, G- and B-switching circuits 110, 120 and 130 apply either one of the original primary color signals R, G and B and the external primary color signals R', G' and B' to output circuits 190, 200 and 210, respectively, in response to the control signal level applied to a switching control terminal $T_{115}$. The output circuits 190, 200 and 210 finally control the pedestal potentials and the amplitude levels of the primary color signals R, G and B or R', G' and B' to be fed to output terminals $T_{111}$, $T_{112}$ and $T_{113}$ in accordance with the voltages applied to an output contrast control terminal $T_{109}$ and an output brightness control terminal $T_{110}$, respectively. The primary color signals R, G and B or R', G' and B' derived from the output terminals $T_{111}$, $T_{112}$ and $T_{113}$ are amplified by output amplifiers (not shown) and then applied to a picture tube (not shown) to display a picture image on an image screen. The output brightness control terminal $T_{110}$ and the output contrast control terminal $T_{109}$ are respectively connected to potentiometers associated with a brightness adjusting knob and a contrast adjustment knob provided on a television receiver set.

The external primary color signals R', G' and B' fed from the multiplex broadcast image signal processing circuit 500 have their pedestal potentials clamped at a reference voltage $V_{ref}$ supplied from a reference voltage source 180 by means of pedestal clamp circuits 140, 150 and 160, respectively, and are then applied to the R-, G- and B-switching circuits 110, 120 and 130, respectively.

Among the pedestal potentials of the original primary color signals R, G and B fed from the video signal processing circuit 10, the pedestal potential of the red primary color signal R, selected as a representative signal, is compared with the reference voltage $V_{ref}$ by means of a comparator 170. The comparator 170 can operate only when a gate pulse is applied to a gate pulse input terminal $T_{114}$ to compare the above-mentioned two potentials. The gate pulse is applied only during a pedestal potential period of the primary color signals R, G and B. This is for the purpose of preventing the A.C. components of the original primary color signals R, G and B from being varied by the output of the comparator 170, as will become apparent from the description below. Accordingly, the gate pulse is generated at the same timing as the clamp pulses applied to the pedestal clamp circuits 60, 70 and 80 and 140, 150 and 160. If desired, the gate pulse is subjected to level conversion and then applied to the comparator 170.

The output of the comparator 170 is applied via a comparator output terminal $T_{100}$ to an external voltage holding circuit 300. This voltage holding circuit 300 generates and holds a voltage at its output end in response to the output of the comparator 170 via the terminal $T_{100}$. The output voltage of the voltage holding circuit 300 is applied to a brightness control terminal $T_{12}$ of the video signal processing circuit 10. Accordingly, the pedestal potentials of the original primary color signals R, G and B fed from the video signal processing circuit 10 are determined depending upon the output voltage from the voltage holding circuit 300. Thus, the output voltage of the voltage holding circuit 300 is controlled by the output of the comparator 170, and the output of the comparator 170 is varied in accordance with the voltage difference between the reference voltage $V_{ref}$ of the reference voltage source 180 and the pedestal potential of the red primary color signal R applied from the input terminal 103. In other words, a feedback loop is established through the comparator 170 and the voltage holding circuit 300 so that the reference voltage $V_{ref}$ and the pedestal potential may be equalized to each other. Owing to the existence of this feedback loop, the pedestal potentials of the original primary color signals R, G and B fed from the video signal processing circuit 10 become equal to the pedestal potentials of the external primary color signals R', G' and B' fed from the multiplex broadcast image signal processing circuit 500.

Owing to the above-mentioned feedback loop, the voltages of the original primary color signals R, G and B fed from the video signal processing circuit 10 are controlled to be equal to the reference voltage $V_{ref}$. Accordingly, if the comparator 170 is continuously operating, the A.C. components of the original primary color signals R, G and B would be adversely affected. Therefore, the comparator 170 is actuated only during the period when a gate pulse generated at the same timing as the clamp pulse applied to the pedestal clamp circuits 60, 70 and 80 and 140, 150 and 160 is applied to the terminal $T_{114}$. If necessary, the same pulse as the clamp pulse could be used as the gate pulse.

As is apparent from the above description, the pedestal potentials of the original primary color signals R, G and B and the pedestal potentials of the external primary color signals R', G' and B' become equal to each other. Therefore, even if the multiplex broadcast image is displayed on a part or whole of the image screen by switching the signals to be derived from the output terminals $T_{111}$, $T_{112}$ and $T_{113}$ by means of the R-, G- and B-switching circuits 110, 120, and 130, the brightness and contrast of the displayed picture image on the image screen would be the same. It is to be noted that the above-described embodiment is designed for the case where the maximum amplitude levels of the original primary color signals R, G and B and the external primary color signals R', G' and B' are equal to each other.

Furthermore, even if the reference voltage $V_{ref}$ fed from the reference voltage source 180 is varied due to the change in the environmental temperature, the output of the comparator 170 will vary by the corresponding amount. As a result, the aforementioned feedback loop operates so that the pedestal potentials of the primary color signals R, G and B may vary in accordance with the variation of the reference voltage $V_{ref}$. In other words, even if the environmental temperature changes, the pedestal potentials of the original primary color signals R, G and B and the pedestal potentials of the external primary color signals R', G' and B' are kept equal to each other. Accordingly, no special circuit arrangement for compensating a temperature change is necessitated.

In addition, owing to the existence of the feedback loop including the pedestal clamp circuits 60, 70 and 80, the comparator 170, and the voltage holding circuit 300, the original primary color signals R, G and B and the external primary color signals R', G' and B' can be inputted to the signal processing circuit 100 by D.C. coupling, and so, the circuit arrangement is suitable to be formed in a monolithic integrated circuit. Furthermore, it is to be noted that for the purpose of equalizing the pedestal potentials of the original primary color signals R, G and B and the external primary color signals R', G' and B', no circuit modification has been made in the video signal processing circuit 10 nor in the multiplex broadcast image signal processing circuit 500. In other words, a television receiver set that can also receive a multiplex broadcast without undesired variation in brightness and contrast of a displayed picture image can be realized by adding the signal processing circuit according to the present invention to a conventional television receiver set. As described above, the signal processing circuit according to the present invention can be formed in an integrated circuit for the interface use that is preferable for multiplex broadcast.

Figure 1:
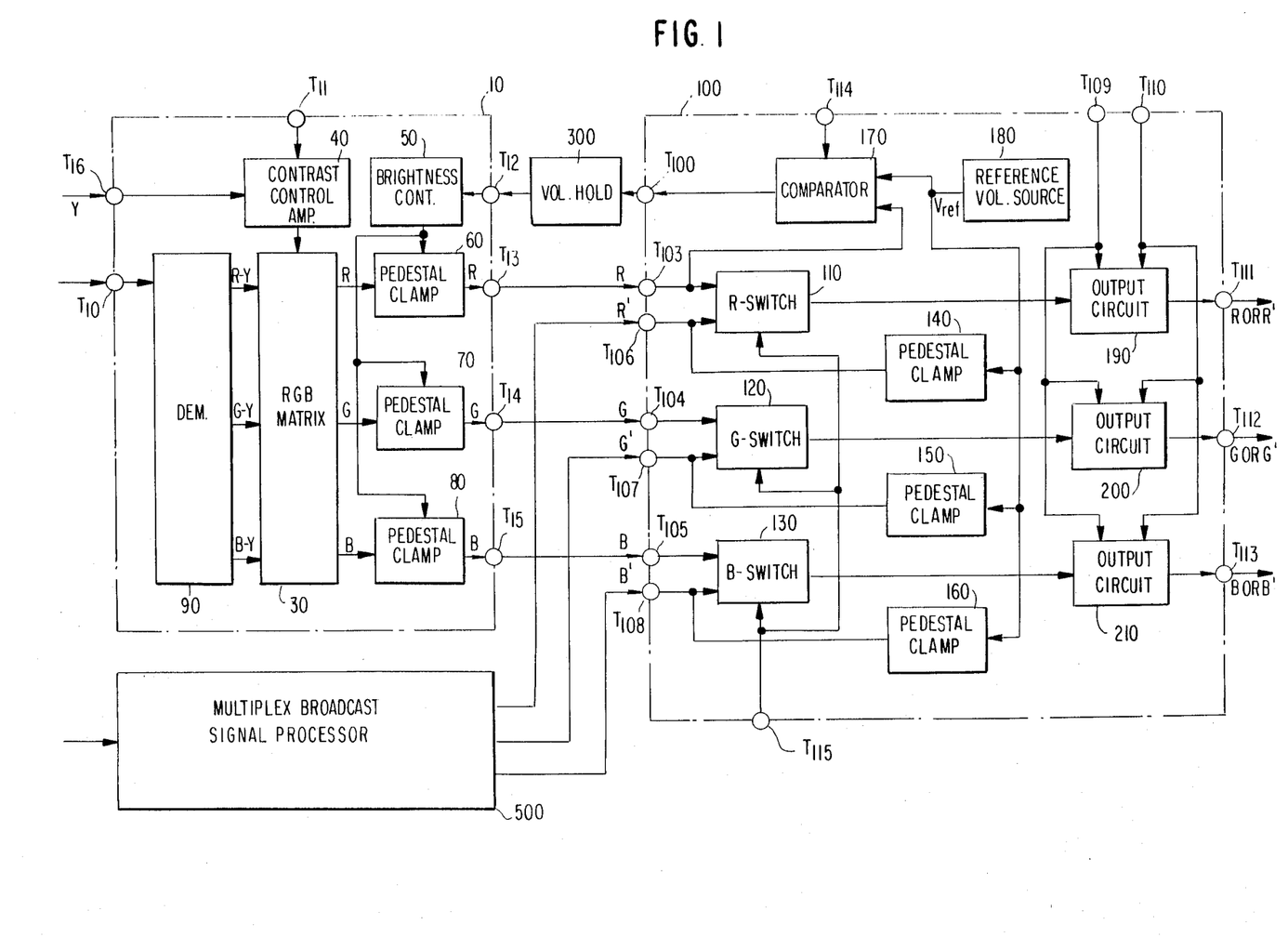
FIG. 1 is a block diagram showing one preferred embodiment of the present invention.
Figure 2:
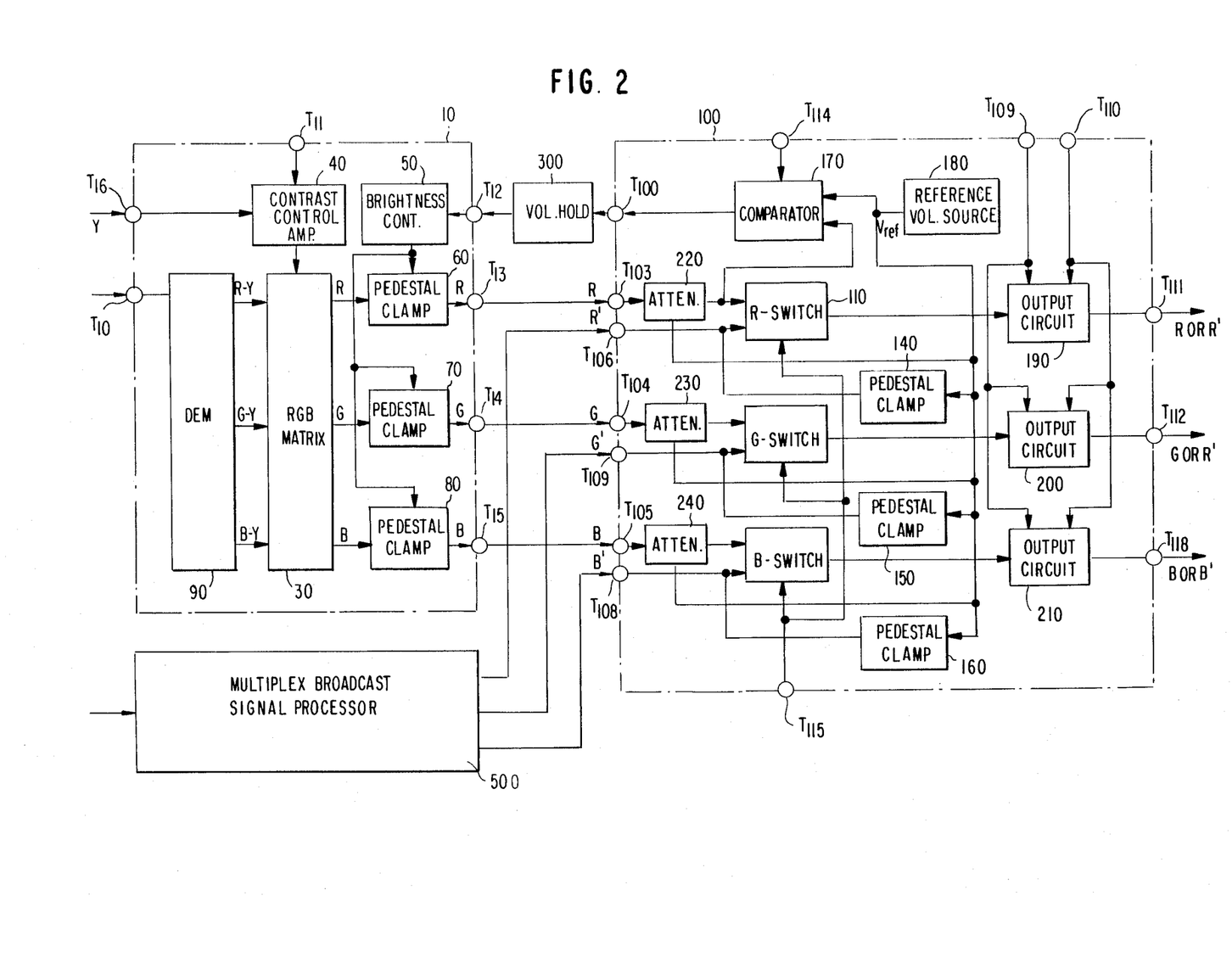
FIG. 2 is a block diagram showing another preferred embodiment of the present invention.

FIG. 2 shows another preferred embodiment of the present invention in which component parts having the same functions as those shown in FIG. 1 are given like reference numerals or symbols, and further description thereof will be omitted here. The embodiment shown in FIG. 2 includes countermeasures for the case where the maximum amplitude levels of the original primary color signals R, G and B is higher than those of the external primary color signals R', G' and B'. To that end, attenuators 220, 230 and 240 each having input, output and common ends are provided in the signal processing circuit 100. The respective input ends of the attenuators 220, 230 and 240 are connected to the terminals $T_{103}$, $T_{104}$ and $T_{105}$, and the output ends thereof are connected to the R-, G- and B-switching circuits 110, 120 and 130, respectively. The common ends of the attenuators 220, 230 and 240 are connected to the reference voltage ($V_{ref}$) terminal of the reference voltage source 180. The output of the attenuator 220 chosen as a representative one of the attenuators 220, 230 and 240 is applied to the comparator 170. The attenuation factors of the respective attenuators 220, 230 and 240 are preset such that the maximum amplitude levels of the original primary color signals R, G and B may become equal to those of the external primary color signals R', G' and B'.

Accordingly, the A.C. components of the original primary color signals R, G and B fed from the video signal processing circuit 10 are attenuated by the attenuators 220, 230 and 240, respectively, so that original primary color signals R, G and B having the same maximum amplitude levels as the external primary color signals R', G' and B' are applied to the R-, G- and B-switching circuits 110, 120 and 130. In other words, the input signal levels applied to the switching circuits 110, 120 and 130 are equalized to the lower levels, and therefore, the effective input dynamic range of the switching circuits 110, 120 and 130 is not decreased. Moreover, since the above-mentioned method is different from the method of lowering the amplitude gain of the original primary color signals R, G and B by manipulating the video signal processing circuit 10, a leakage current of a carrier component contained in the color difference signal is not increased. In other words, the original primary color signals R, G and B derived from the video signal processing circuit 10 are in themselves attenuated, and the carrier component is therefore attenuated together with the signal component. As a result, there is substantially no degradation in the S/N ratio of the output signal applied to the picture tube for displaying television picture image. The D.C. levels of the outputs of the attenuators 220, 230 and 240 are equalized to the reference voltage $V_{ref}$ by the effects of the feedback loop including the comparator 170. The common ends of the attenuators 220, 230 and 240 are connected to the reference voltage $V_{ref}$. Consequently, the D.C. voltage of the original primary color signals R, G and B, that is, their pedestal potentials, are the same at the input ends and at the output ends of the attenuators 220, 230 and 240, and thus there is no variation in the D.C. potentials. Accordingly, the input signal to the attenuator 220, 230 or 240 may be applied to the comparator 170 to obtain the same the pedestal potential as the reference voltage $V_{ref}$.

As described above, by providing the attenuators 220, 230 and 240 within the signal processing circuit 100, either one of the original primary color signal group (R, G, B) and the external primary color signal group (R', G', B') whose pedestal potentials and maximum amplitude levels have been equalized, can be selectively output. Accordingly, in the same manner as the first preferred embodiment shown in FIG. 1, by adding the signal processing circuit according to the present invention to the conventional television receiver set, it becomes possible to display multiplex broadcast images in addition to or in place of the ordinary television images.

Figure 3:
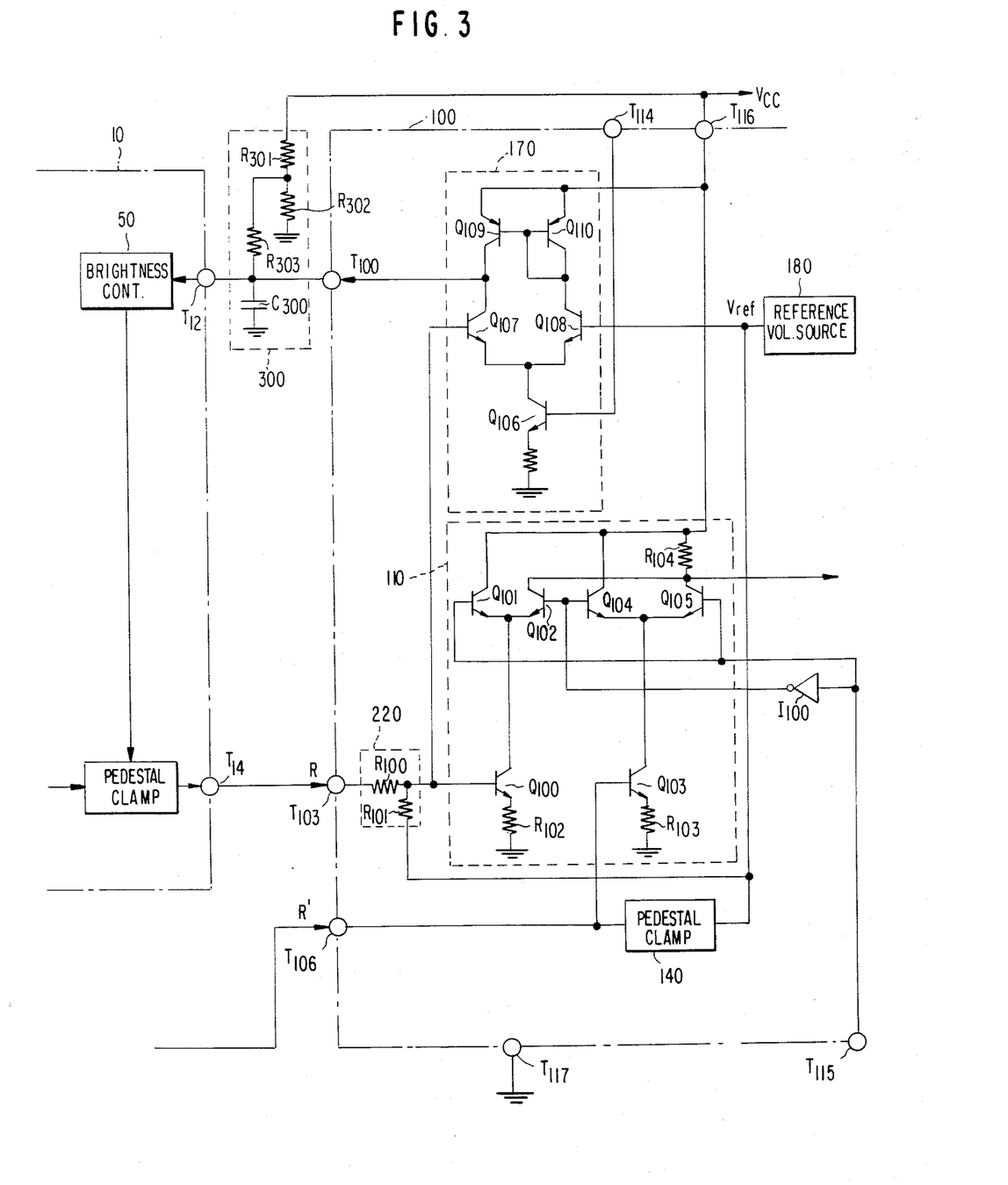
FIG. 3 is a circuit diagram showing a part of the blocks shown in FIG. 2 in greater detail.

FIG. 3 shows detailed circuit constructions of the attenuator 220, R-switching circuit 119, comparator 170 and voltage holding circuit 300 in FIG. 2. Other circuit blocks having the same functions as those shown in FIG. 2 are given like reference numerals, and further description thereof will be omitted here. In addition, since each of the attenuators 230 and 240 and each of the G-switching circuit 120 and the B-switching circuit 130 in FIG. 2 have the same circuit constructions as those of the attenuator 220 and the R-switching circuit 110 illustrated in FIG. 3, for simplicity of the illustration, only the signal paths relating to the red original primary color signal R and the red external primary color signal R' within the signal processing circuit 100 according to the present invention are shown in FIG. 3.

In FIG. 3, the attenuator 220 comprises a resistor $R_{100}$ connected between the input and output ends of the attenuator and a resistor $R_{101}$ connected between the output and common ends.

A red original primary color signal R through the attenuator 220 is applied to the base of a transistor $Q_{100}$ within the R-switching circuit 110. The emitter of the transistor $Q_{100}$ is grounded via a resistor $R_{102}$. The collector of the transistor $Q_{100}$ is connected to the emitter common junction point of transistors $Q_{101}$ and $Q_{102}$. A red external primary color signal R' applied via a terminal $T_{106}$ is fed to the base of a transistor $Q_{103}$ within the R-switching circuit 110. The emitter of the transistor $Q_{103}$ is grounded via a resistor $R_{103}$, and its collector is connected to the emitter common junction point of transistors $Q_{104}$ and $Q_{105}$. The resistors $R_{102}$ and $R_{103}$ are selected to have the same resistance value. The bases of the transistors $Q_{101}$ and $Q_{105}$ are connected in common and are also connected to the switching control terminal $T_{115}$. The bases of the transistors $Q_{102}$ and $Q_{104}$ are connected in common and are also connected via an inverter $I_{100}$ to the switching control terminal $T_{115}$. The collectors of the transistors $Q_{101}$ and $Q_{104}$ are connected in common and also connected to a power supply terminal $T_{116}$ that is not shown in FIG. 2. The collectors of the transistors $Q_{102}$ and $Q_{105}$ are commonly connected via a load resistor $R_{104}$ to the power supply terminal $T_{116}$ and are further connected to the output circuit 190 shown in FIG. 2.

The pedestal potential of the original primary color signal R is compared with a reference voltage $V_{ref}$ of a reference voltage source 180 by means of the comparator 170. Hence, the output of the attenuator 220 is applied to the base of a transistor $Q_{107}$, and the reference voltage $V_{ref}$ is applied to the base of a transistor $Q_{108}$. The emitters of the transistors $Q_{107}$ and $Q_{108}$ are connected in common and are also connected to the collector of a transistor $Q_{106}$. The emitter of the transistor $Q_{106}$ is grounded via a resistor $R_{105}$ and its base is connected to the gate pulse input terminal $T_{114}$. Accordingly, the transistor $Q_{106}$ forms a constant current source for the transistors $Q_{107}$ and $Q_{108}$, and at the same time controls the operation period of the comparator 170 because the transistor $Q_{106}$ becomes conductive only when the gate pulse is applied to the terminal $T_{114}$.

The collectors of the transistors $Q_{107}$ and $Q_{108}$ are respectively connected to the power supply terminal $T_{116}$ through collector-emitter paths of transistors $Q_{109}$ and $Q_{110}$. The bases of the transistors $Q_{109}$ and $Q_{110}$ are connected in common and are connected also to the collector of the transistor $Q_{110}$. Accordingly, the transistors $Q_{109}$ and $Q_{110}$ form an active load for the transistors $Q_{107}$ and $Q_{108}$. The output of the comparator 170 is derived from the collector of the transistor $Q_{107}$. This output of the comparator 170 is applied via the terminal $T_{100}$ to the voltage holding circuit 300.

The voltage holding circuit 300 comprises resistors $R_{301}$ and $R_{302}$ for dividing the operating voltage $V_{cc}$ applied to the terminal $T_{116}$. One end of a resistor $R_{303}$ is connected to the junction point between the resistors $R_{301}$ and $R_{302}$, and the other end is grounded through a capacitor $C_{300}$. The junction point between the resistor $R_{303}$ and the capacitor $C_{300}$ is connected to the terminal $T_{100}$ and is also connected to a terminal $T_{12}$ of a video signal processing circuit 10. The signal processing circuit 10 also has a ground terminal $T_{117}$ that is not shown in FIG. 2, and the resistors $R_{102}$, $R_{103}$ and $R_{105}$ each have one end connected to the ground terminal $T_{117}$.

Now, description will be made on the operation of the circuit shown in FIG. 3. The red original primary color signal R fed from the video signal processing circuit 10 has a maximum amplitude level of 3 Vp-p. On the other hand, the red external primary color signal R' has a maximum amplitude level of 1 Vp-p. The resistances of the resistors $R_{100}$ and $R_{101}$ are preset respectively at 2 K$\Omega$ and 1 K$\Omega$, so that the attenuation factor of the attenuator 220 is equal to $\frac{1}{3}$. Accordingly, the red primary color signal R passed through the attenuator 220 has a maximum amplitude level of 1 Vp-p which coincides with that of the red external primary color signal R'.

The red external primary color signal R' has its pedestal potential clamped at the reference voltage $V_{ref}$ of 2 V by means of a pedestal clamp circuit 140, and then it is applied to the base of the transistor $Q_{103}$.

The red original primary color signal R passed through the attenuator 220 is applied not only to the base of the transistor $Q_{100}$ in the R-switching circuit 110 but also to the base of the transistor $Q_{107}$ in the comparator 170. As noted previously, the transistor $Q_{106}$ becomes conductive only during the period when the gate pulse is applied to the terminal $T_{114}$, so that the comparator 170 is brought into an operable condition. The application of the gate pulse to the terminal $T_{114}$ is effected when the red original primary color signal R presents its pedestal potential, and therefore, the transistors $Q_{107}$ and $Q_{108}$ therefore compare the pedestal potential of the red original primary color signal R with the reference voltage $V_{ref}$. Assuming now that the reference voltage $V_{ref}$ is higher than the pedestal potential of the red original primary color signal R, the current flowing through the transistor $Q_{108}$ is large, while the current flowing through the transistor $Q_{107}$ is small. The transistors $Q_{109}$ and $Q_{110}$ not only form an active load, but also constitute a current-mirror circuit. Hence a current equivalent to the current flowing through the transistor $Q_{110}$ flows through the transistor $Q_{109}$. However, the current flowing through the transistor $Q_{107}$ is small. Consequently, a part of the current flowing through the transistor $Q_{109}$ outflows via the terminal $T_{100}$ into the voltage holding circuit 300 as a charging current for the capacitor $C_{300}$.

The resistors $R_{301}$ and $R_{302}$ in the voltage holding circuit 300 have resistances of 1 K$\Omega$ and 5.1 K$\Omega$, respectively, and the resistance and capacitance values of the resistor $R_{303}$ and the capacitor $C_{300}$ are chosen to be 56 K$\Omega$ and 2.2 $\mu$F, respectively, to establish a large time constant for holding a voltage. Under a stationary state, the capacitor $C_{300}$ has been charged through the resistor $R_{303}$ and is in a predetermined voltage holding condition. Since the power supply voltage $V_{cc}$ is 12 V, the voltage across the capacitor $C_{300}$ is about 9 V.

However, when a charging current is fed from the transistor $Q_{109}$, that is, when the reference voltage $V_{ref}$ is higher than the pedestal potential of the red original primary color signal R, then the voltage across the capacitor $C_{300}$ will rise. As a result, the voltage applied to the brightness control terminal $T_{12}$ of the video signal processing circuit 10 also rises, so that the pedestal potential of the red original primary color signal R is raised by means of the brightness control circuit 50 and the pedestal clamp circuit 60. On the other hand, in the event that the pedestal potential of the red original primary color signal R is higher than the reference voltage $V_{ref}$, a current flowing through the transistor $Q_{107}$ is larger than that through the transistor $Q_{108}$. However, the transistor $Q_{109}$ cannot feed an ample current to the transistor $Q_{107}$. Consequently, a current is fed from the capacitor $C_{300}$ to the transistor $Q_{107}$. In other words, the capacitor $C_{300}$ is discharged and hence the voltage accross the capacitor $C_{300}$ is lowered. As a result, the pedestal potential of the red original primary color signal R is lowered. Owing to the above-mentioned feedback loop, the pedestal potential of the red original primary color signal R can be equalized to the reference voltage $V_{ref}$. Since the common terminal of the attenuator 220 is connected to the reference voltage $V_{ref}$ point, variation of a D. C. component of the primary color signal R does occur.

As described above, a red original primary color signal R and a red external primary color signal R' whose pedestal potentials as well as maximum amplitude levels have been equalized to each other, are applied to the R-switching circuit 110.

Assuming now that the switching signal at a high level has been applied to the terminal $T_{115}$, then the transistors $Q_{101}$ and $Q_{105}$ become conducting. On the other hand, a signal produced by inverting the switching signal through the inverter $I_{100}$ is applied to the bases of the transistors $Q_{102}$ and $Q_{104}$, and these transistors $Q_{102}$ and $Q_{104}$ are therefore turned OFF. Accordingly, the red original primary color signal R applied via the transistor $Q_{100}$ does not appear across the resistor $R_{104}$ because the transistor $Q_{102}$ is held OFF. On the other hand, the transistor $Q_{105}$ is held ON, and hence the red external primary color signal R' appears across the resistor $R_{104}$ via the transistor $Q_{103}$ and is applied to the output circuit 190. In other words, when a high level signal is applied to the terminal $T_{115}$, the red external primary color signal R' is output.

On the other hand, when a switching signal at a low level is applied to the terminal $T_{115}$, the transistors $Q_{101}$ and $Q_{105}$ are turned OFF, while the transistors $Q_{102}$ and $Q_{104}$ are turned ON. As a result, the red original primary color signal R would be applied to the output circuit 190. Since the resistors $R_{102}$ and $R_{103}$ have the same resistance value (2.2 K$\Omega$) as described above, the transistors $Q_{100}$ and $Q_{103}$ have the same amplification gain. In addition, the transistors $Q_{101}$, $Q_{102}$, $Q_{104}$ and $Q_{105}$ form a dual differential type switching circuit. As a result, the relationships of the pedestal potentials and the maximum amplitude levels between the two input signals R and R' applied to the R-switching circuit 110 can be maintained, and one of the signals can be selectively applied to the output circuit 190.

As described above, according to the present invention, there is provided a signal processing circuit applicable to a signal switching circuit which can not be effected by a change in the environmental temperature and which maintains pedestal potentials and maximum amplitude levels of two signal groups equal to each other, and which is also suitable for formation in an integrated circuit.

It is to be noted that, in the case where the original primary color signals and the external primary color signals have the same maximum amplitude level, the attenuator 220 shown in FIG. 3 becomes unnecessary. In addition, the constructions of the comparator 170 and the switching circuit 110 are not necessarily limited to the illustrated circuit arrangement. Moreover, the signal processing circuit according to the present invention can be matched with any other video signal processing circuit having at least a brightness control terminal and primary color signal output terminals.

What is claimed is:

1. A signal processing circuit comprising switching means for receiving a first signal having a pedestal potential and representing a first image and a second signal having a pedestal potential and representing a second image and for outputting either one of said first and second signals, clamping means for clamping the pedestal potential of said second signal at a reference voltage, comparator means for comparing the pedestal potential of said first signal with said reference voltage and for providing an output, and feedback means responsive to the output of said comparator means for equalizing the pedestal potential of said first signal to said reference voltage.

2. A signal processing circuit as claimed in claim 1, further comprising attenuator means having an attenuation factor and inserted in the input path of said first signal to said switching means.

3. A signal processing circuit as claimed in claim 2, in which said attenuator means has input, output and common ends, said first signal being applied to said input end, said output end being coupled to said switching means, said reference voltage being applied to said common end, and the attenuation factor of said attenuator means being preset such that the maximum amplitude levels of said first and second signals are equalized to each other.

4. A combination suitable for a television receiver, comprising, first signal processing means for generating at least one first signal having a first D.C. level, first clamping means for clamping said first D.C. level of said first signal to a first voltage, second signal processing means for generating at least one second signal having a second D.C. level, generating means for generating a second voltage, second clamping means for clamping said second D.C. level of said second signal to said second voltage, comparing means for comparing said first D.C. level clamped to said first voltage with said second voltage, producing means responsive to an output of said comparing means for producing a third voltage, said third voltage being varied by said output of said comparing means, supplying means for supplying a voltage proportional to said third voltage to said first clamping means as said first voltage, receiving means for receiving said first signal having the first D.C. level clamped to said first voltage and said second signal having the second D.C. level clamped to said second voltage, said receiving means having first and second transistor amplifiers whose gains are subtantially identical, and output means coupled to said receiving means for outputting one of said first and second signals, said output means having first and second differential amplifiers coupled to said first and second transistor amplifiers, respectively.

5. A combination as claimed in claim 4, further comprising means for selectively enabling only one of said differential amplifiers at any given time.

6. A signal processor comprising a first input terminal supplied with a first color signal having a pedestal level, a second input terminal supplied with a second color signal having a pedestal level, a reference voltage generator generating a reference voltage, a clamp circuit clamping the pedestal level of said second color signal to said reference voltage, a comparator comparing the pedestal level of said first color signal with said reference voltage and generating an output corresponding to a voltage difference between the pedestal level of said first color signal and said reference voltage equalizing means responsive to said comparator output for equalizing the pedestal level of said first color signal to said reference voltage, a switching control terminal, and a switching circuit coupled to said switching control terminal and having first and second input ends respectively supplied with said first and second color signals whose pedestal levels are equal with each other and an output end, said switching circuit supplying one of said first and second color signals to the output end thereof in response to a control signal supplied to said switching control terminal.

7. A signal processor as claimed in claim 6, further comprising an attenuator having input, output and common ends, said input end of said attenuator being connected to said first input terminal, said output end of said attenuator being connected to said first input end of said switching circuit, said common end of said attenuator being supplied with said reference voltage, and said attenuator attenuating said first signal with an attenuation factor whereby the maximum amplitude level of said first color signal becomes equal to that of said second color signal.

8. A signal processor as claimed in claim 6 or 7, wherein said switching circuit has first and second transistors of a common-emitter type, third and fourth transistors constituting a first differential amplifier, and fifth and sixth transistors constituting a second differential amplifier, bases of said first and second transistors being connected to said first and second input ends of said switching circuit, collectors of said first and second transistors being coupled to said first and second differential amplifiers, said third and sixth transistors being turned on in response to a first level of said control signal, said fourth and fifth transistors being turned on in response to a second level of said control signal, and a signal through said fourth transistor or said sixth transistor being supplied to said output end of said switching circuit in accordance with said control signal.

9. A signal processor as claimed in claim 8, further comprising a gate pulse input terminal receiving a gate pulse, said comparator having a seventh transistor receiving said gate pulse from said gate pulse input terminal, and eighth and ninth differentially connected transistors receiving said pedestal level of said first color signal and said reference voltage, respectively, said eighth and ninth transistors being enabled by said seventh transistor in response to said gate pulse.

10. A combination suitable for a television receiver, comprising:

first signal processing means for generating at least one first signal having a first D.C. level;

first clamping means for clamping said first D.C. level of said first signal to a first voltage;

second signal processing means for generating at least one second signal having a second D.C. level;

generating means for generating a second voltage;

second clamping means for clamping said second D.C. level of said second signal to said second voltage;

comparing means for comparing said first D.C. level clamped to said first voltage with said second voltage;

producing means responsive to an output of said comparing means for producing a third voltage, said third voltage being varied by said output of said comparing means;

supplying means for supplying a voltage proportional to said third voltage to said first clamping means as said first voltage;

receiving means for receiving said first signal having the first D.C. level clamped to said first voltage and said second signal having the second D.C. level clamped to said second voltage;

output means coupled to said receiving means for outputting one of said first and second signals; and attenuating means for attenuating said first signal, said receiving means receiving said first signal through said attenuating means.

* * * * *

UNITED STATES PATENT AND TRADEMARK OFFICE
CERTIFICATE OF CORRECTION

PATENT NO. : 4,489,344

DATED : December 18, 1984

INVENTOR(S) : Masaki IKEDA; Tatsuyuki AMANO; Kazuo TOKUDA

It is certified that error appears in the above-identified patent and that said Letters Patent is hereby corrected as shown below:

Column 2, line 26, insert --the-- after "equalize".

Column 7, line 50, insert --the-- after "displaying".

line 62, after "same" delete "the".

Column 8, line 10, "199" should be --110--.

Column 9, line 24, "on" should be --of--;

line 33, "5/8" should be --1/3--.

Column 10, line 29, "accross" should be "across--.

Signed and Sealed this

Twenty-ninth Day of October 1985

[SEAL]

Attest:

Attesting Officer

DONALD J. QUIGG

Commissioner of Patents and Trademarks—Designate